United States Patent Office 2,705,456
Patented Apr. 5, 1955

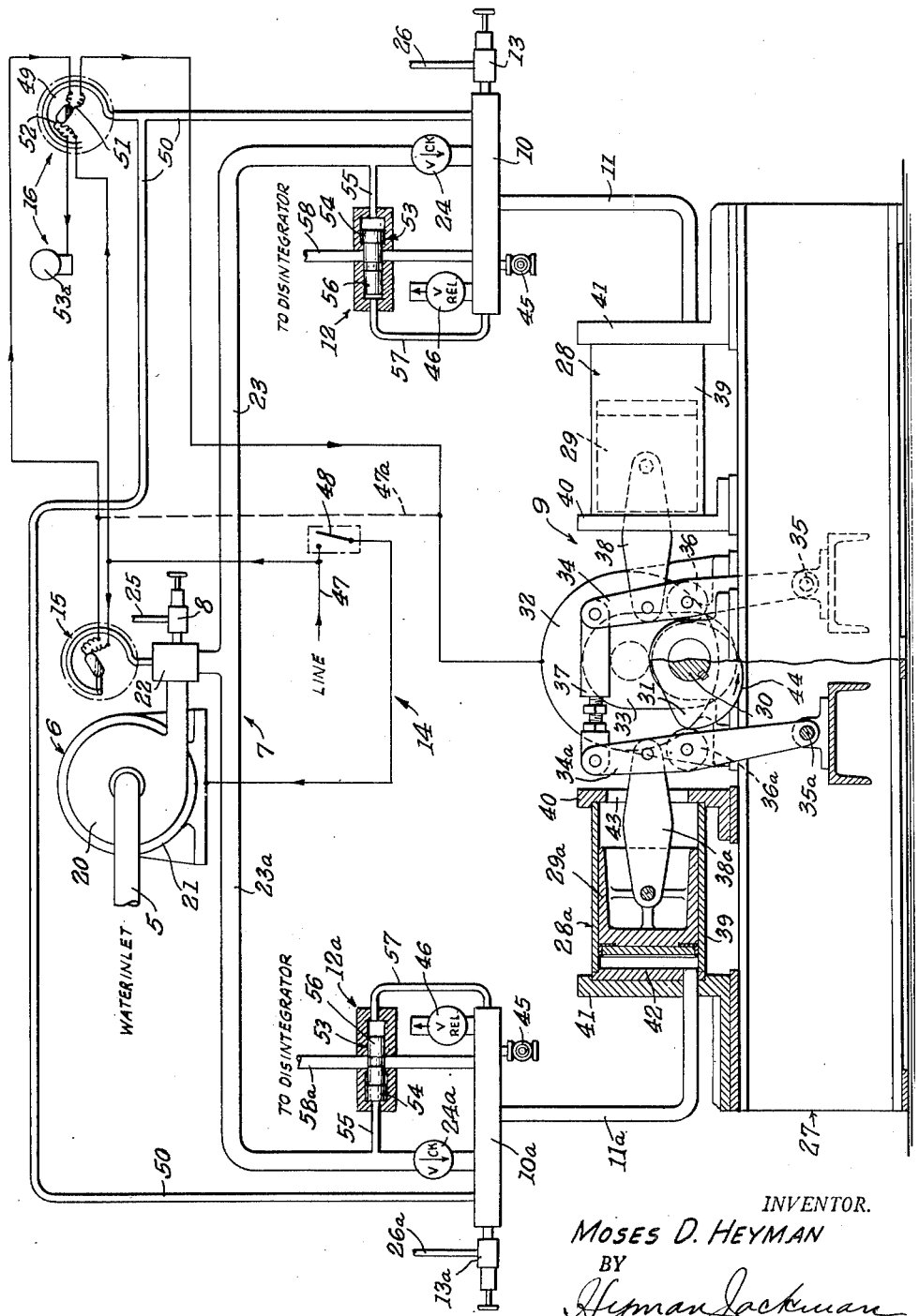

2,705,456

APPARATUS FOR INTERMITTENTLY DELIVERING LIQUID IN UNIFORM AMOUNTS, AT A UNIFORM RATE, AND UNDER CONSTANT PRESSURE

Moses D. Heyman, Woodmere, N. Y., assignor to Integrated Mica Corp., Woodmere, N. Y., a corporation of New York Application December 20, 1951, Serial No. 262,508

8 Claims. (Cl. 103—5)

This invention relates to means for delivering liquid at uniform intervals of time, in uniform amounts, and at desired and constant pressures. This application is a continuation-in-part of my pending application, Ser. No. 201,020, filed December 20, 1950, now Patent No. 2,659,412.

While the present apparatus may have general use where intermittent delivery of uniform quantities of liquid under constant pressure is required, the same is particularly adapted to supply liquid to mica-splitting disintegrators such as disclosed in my pending application, Ser. No. 164,333, filed May 26, 1950, now Patent No. 2,612,889. Such disintegrators are designed to operate intermittently, liquid jets splitting the mica pieces therein alternately with a stopping of the jets to arrest circulation of the pieces as induced by the jets to allow the finer or thinner splittings to float upwardly in the liquid medium in which the mica is split. The efficiency of these disintegrators and the uniformity of an integrated sheet formed from the flakes produced thereby are largely dependent on the uniformity of the amount and pressure of the liquid intermittently delivered to the disintegrators. The foregoing is merely one example of a use for the present apparatus, as before stated.

Proportioning pumps that intermittently deliver quantities of liquid are well-known in the field of chemistry and also for feeding fuel to diesel engines. However, none of the prior available devices can deliver both constant quantities of liquid and such quantities at a constant rate and under a constant pressure. Nor are the known devices available in large output sizes of the capacity required to feed mica disintegrators. It is, therefore, an object of the present invention to provide apparatus of the character indicated that will intermittently deliver accurate and relatively large amounts of liquid at a constant rate and pressure throughout the delivery cycle.

Another object of the invention is to provide a constant-pressure proportioning pump apparatus that is controlled by cam means that imparts a constant pumping speed throughout the pumping stroke of the apparatus to enable achievement of a constant delivery rate and pressure.

Another object of the invention is to provide apparatus of the present character that obviates variable volume and pressure of delivery liquid by the elimination of trapped air in the liquid entering the apparatus.

A further object of the invention is to provide proportioning pump apparatus in which the liquid entering the apparatus is supplied under substantial pressure that not only reduces entrapped air to an immaterial minimum but also serves to provide a back- or counter-balancing pressure to the pressure of the liquid that is delivered, to thereby reduce wear on the cam means and the related parts of the apparatus.

A still further object of the invention is to provide a pump apparatus, as indicated, in which the delivery pressure is created in excess of the required pressure and then automatically regulated to the pressure required, thereby insuring constant pressure throughout delivery.

The foregoing and other objects, features, and advantages of the invention will become more clearly evident as the following description progresses, said description being based on the accompanying drawing which shows an embodiment of the invention at present preferred.

In said drawing the figure is a schematic view of pump apparatus embodying features of the invention.

The pumping apparatus that is illustrated comprises, generally, a liquid inlet 5, means 6 for receiving and pumping the liquid from the inlet under a substantially constant pressure, a conduit 7 receiving delivery of means 6, a pressure regulator 8 in said conduit to control the pressure of the liquid flowing in said conduit to maintain said pressure constant, a proportioning pump unit 9 receiving the flow of the conduit 7, said conduit being shown as embodying manifolds or headers 10 and 10a and also conduits 11 and 11a, the latter conduits serving both as inlet and outlet means for the pump unit 9, pressure-responsive valves 12 and 12a for controlling flow from said pump unit, pressure regulators 13 and 13a for the outlet liquid of said pump unit, and an electrical system 14 controlling the operation of means 6 and unit 9 and including switch means 15 responsive to the pressure in conduit 7 and, optionally, switch and alarm means 16 responsive to the pressure of the outlet liquid and providing safety for the apparatus against excessive pressures in the apparatus.

Inlet 5 may be connected to any desired source of supply and the same may come from a tank into which regulators 8, 13 and 13a may discharge. The liquid may be water reasonably free of impurities, or the same may be other liquids that do not leave a residue upon evaporation. Examples of the latter are methyl alcohol, carbon tetrachloride, and aromatic solvents such as toluene, xylene, etc. The above-mentioned liquids are preferred if delivery of the apparatus is to a mica-splitting disintegrator, otherwise any free-flowing liquid may be handled by the apparatus.

Means 6 comprises a constant-pressure delivery pump 20 of any suitable design, and a motor 21 connected to drive said pump. Hereinafter, pump 20 will be termed a fore pump.

Conduit 7 is shown as connected at a fitting 22 to receive the delivery of fore pump 20 and said conduit is divided into branches 23 and 23a to connect to the respective manifolds 10 and 10a. Check valves 24 and 24a are provided in respective branches 23 and 23a to insure flow of liquid from the fore pump only toward the manifolds.

It will be understood that the manifolds 10 and 10a are employed as a convenient way of connecting the various pipes of the apparatus. The same, in practice, are placed adjacent to and alongside the ends of pump unit 9 to provide a compact apparatus. The arrangement, providing the present inter-connection of the pipes and conduits is retained, may be changed as desired.

It will be clear that the liquid delivered by fore pump 20 has two paths to the opposite ends of pump unit 9— one through branch 23, manifold 10 and conduit 11, and the other through branch 23a, manifold 10a, and conduit 11a.

Pressure regulator 8 comprises a device such as a needle valve that controls flow through an outflow pipe 25 and, thereby, constitutes a flow and pressure bleeder for conduit 7. Said regulator can be set to bleed excess pressure to retain the pressure in said conduit at a desired constant. Regulators 13 and 13a are similar devices that constitute flow and pressure bleeders for outlet liquid in conduit 11 and manifold 10, and conduit 11a and manifold 10a, respectively. These latter regulators discharge through pipes 26 and 26a.

The proportioning pump unit 9 comprises, generally, a base 27, a pair of opposed cylinders 28 and 28a mounted on opposite ends of said base, a pair of opposed pistons 29 and 29a operable in the respective cylinders, a drive shaft 30 supported on the base midway between said cylinders, a cam 31 fixed to the shaft, an electric motor 32 to drive said shaft and cam, a speed reducer 33 interposed between the motor and shaft to reduce the speed of rotation of the shaft relative to the speed of the motor, a pair of rockers 34 and 34a mounted on the base on respective pivots 35 and 35a and provided with cam followers 36 and 36a, respectively, on opposite sides of cam 31, an adjustable member 37 connecting the free ends of the rockers, and a pair of links 38 and 38a connecting the respective pistons and rockers.

Base 27 may be fabricated in any suitable manner to provide a rigid support for the pump components mounted thereon.

Cylinders 28, 28a each comprise a cylinder jacket 39 supported at its ends by brackets 40 and 41. The latter or, as shown, a separate plate 42 constitutes the head of each cylinder and is on the outer end thereof. Brackets 40 are provided with openings 43 thereby opening the inner ends of the cylinders. Conduits 11 and 11a are preferably connected to the lower portions of the cylinder heads 42 so as to drain substantially all of the liquid displaced from said cylinders during the projecting strokes of the pistons thereof.

Cam 31 is designed as a constant-rise cam in which face 44 is in the form of an Archimedes spiral. In the present arrangement, said cam has a counter-clockwise rotation, as shown by the arrow, and it will be clear that face 44 of the cam alternately engages followers 36 and 36a to alternately project pistons 29 and 29a toward their respective cylinder heads 42 at a constant speed as imparted by the constant rise of cam face 44.

Rockers 34 and 34a move in unison on their respective pivots, the rocker engaged by cam face 44 being the active rocker while the other rocker follows through the medium of the adjustable connection 37.

Each manifold 10 and 10a is provided with a drain cock 45 and with a pressure relief valve 46. Electrical system 14 comprises a line source of current 47 that is connected to switch 15 and motor 32. Dotted line 47a shows a direct connection for said switch and motor should the optional switch and alarm means 16 not be used. Switch 15 is normally open as shown and motor 32 is, therefore, inoperative until said switch is closed as hereinafter described. System 14 includes a master or starter switch 48 that connects line 47 and fore pump motor 21.

Switch 15 is shown as of the tiltable mercury tube type and the same is connected to fitting 22 so as to be operable to close by pressure of liquid discharged by fore pump 20 and only when said pressure has reached a predetermined degree.

Switch and alarm means 16 embodies a switch 49 that is controlled by pressure in connections 50 extending from manifolds 10 and 10a. In this case, the mercury tube has two sets of terminals. One set 51 is connected in series with switch 15 and motor 32 and is normally closed, and the other set 52 is connected in series with line 47 and an alarm device 53a and is normally open. It will be clear that tilting of switch 49 from the postion shown will open the circuit to motor 32 and close the alarm circuit.

Each of the valves 12 and 12a comprises a differential piston 53 having a large end disposed to be subject to the pressure of liquid flowing in conduit 7 from fore pump 20, as through a connection 55, and a small end 56 disposed to receive the pressure of liquid from cylinders 28 and 28a, as through a connection 57. It will be seen that each valve 12 and 12a is connected across or in parallel with its respective check valve.

Discharge liquid from cylinders 28 and 28a is controlled by the respective valves 12 and 12a by alternately opening and closing discharge pipes 58 and 58a extending from the manifolds according to the positions assumed by the differential pistons as controlled by the pressures involved.

*Operation*

Switch 48 is closed to start operation of fore pump 20 which forces liquid into fitting 22 and conduit 7. At first, the pressure in said conduit is relatively low but, as the same fills up to the heads of pistons 29 and 29a, the pressure rises. Switch 15 is set to respond to a predetermined pressure in conduit 7 and, when such pressure is achieved, said switch closes to start operation of motor 32. Since switch 15 remains open until a desired minimum pressure has been created in conduit 7, it will be evident that proportioning pump unit 9 remains inoperative until said switch is closed. By bleeding excess pressure and also air that is entrapped in the flow, regulator 8 maintains a desired and constant pressure regardless of fluctuations in electric current in line 47, variations in the speed of motor 21, etc. In practice, this pressure is of substantial degree. As an example, the pressure may be 200 p. s. i. because the same is utilized to, in part, offset or counterbalance the substantially higher pressure by the liquid discharged from cylinders 28 and 28a.

Following the flow on branch 23 of conduit 7, before the pressure reaches check valve 24 it enters connection 55 and subjects the large end of differential piston 53 to said pressure. The liquid that passes said check valve enters manifold 10 and, by way of connection 57, subjects the small end 56 to the same pressure. The unit pressure on both ends of piston 53 being the same, the greater total pressure on the larger end will result in said piston sliding to the position shown wherein discharge pipe 58 is closed to discharge flow.

During such delivery of pressure liquid to cylinder 28, cam 31 is slowly rotating and retracts piston 29 so that cylinder 28 is filled. At this stage the elements of pump 9 are in the position shown, said cam being at the point of starting projection, at a constant speed, of piston 29.

At the time that piston 29 was retracting and cylinder 28 was being filled, the constant-rise portion 44 of the cam was projecting piston 29a and forcing liquid from cylinder 28a through conduit 11a into header or manifold 10a. This liquid is at substantially higher pressure than the pressure supplied by fore pump 20 to branch 23a. Since this high pressure liquid cannot return past check valve 24a, it must enter pipe 58a and the connection 57 leading to the small end 56 of piston 53 of valve 12a. Now the unit pressure delivered through connection is substantially greater than the unit pressure on large end 54 so that the total pressure on said small end is greater than and overcomes the total pressure on the large end. Thus, the piston 53 will be slid to a position, as shown, to open pipe 58a for discharge therefrom of high pressure liquid displaced from cylinder 28a. Regulator 13a is set to maintain said pressure constant. Since piston 29a moves at a uniform speed throughout its projection stroke, the liquid displaced thereby is fed at a constant rate and at a constant pressure to a disintegrator or other device connected to receive the discharge of pipe 58a. Since the stroke of the piston is the same for each delivery, the quantity of liquid discharged each time is the same.

When the high point or lobe of cam 31 reaches follower 36 of rocker 34, the foregoing operation is reversed, cylinder 28a receiving liquid from conduit 7 and cylinder 28 discharging high pressure liquid through pipe 58. In the above manner there are alternate discharges from pipes 58 and 58a of similar amounts of liquid at the same and constant rates of speed and at the same high pressure.

The high delivery pressure on pistons 29 and 29a results in a high resistance to rotation of cam 31 by reason of the great pressure on said cam, and also considerable stress and friction on the rockers, followers, and links and on the pivots and connecting pins of said elements. Since the fore pump pressure is applied constantly, the pressure thereof is always counter-balancing or in opposition to the delivery pressure on each piston 29 or 29a. Consequently, the mentioned elements and the cam are subject only to the difference of the two pressures involved with a resultant reduction of wear and breakage of the parts and also a substantial reduction of the load on motor 32.

Pressure relief valves 46 are provided as a safety precaution in the event that high pressure liquid cannot be passed as described. These valves are set somewhat higher than the setting of regulators 13 and 13a.

Instead of relief valves 46 or in addition thereto, the alarm means 16 may be provided, switch 49 thereof being set to open the circuit to motor 32 and close the circuit to alarm device 53a when the pressure in connections 50 becomes so abnormally high that the safety of the apparatus is endangered. While it is shown that only motor 32 is shut off by excessive pressure, motor 21 can be so connected as to shut off also.

While I have disclosed what I now regard as the preferred form of my invention, the same, of course, is subject to modification within the spirit and scope of my invention. Therefore, I desire to reserve to myself such modifications and variations of the embodiment disclosed that may fall within the spirit and scope of the appended claims.

Having thus described my invention, what I claim and desire to obtain by Letters Patent, is:

1. Liquid pumping apparatus comprising, in combination, a pump unit having opposed cylinders and pistons in said cylinders connected to move in unison and provided with a drive including a constant-rise cam for reciprocating the pistons at a uniform speed, conduit means divided into two branches connected one to each cylinder, a fore pump to supply liquid to the conduit means and, thereby, to said cylinders, a differential piston valve connected across each conduit branch, a check valve in each branch between the connections of the respective differential piston valves to check flow in said branches in a direction back to the fore pump, each said piston valve being arranged with the larger end of its differential piston directed to receive the pressure of the liquid supplied by the fore pump and on the inlet side of each respective check valve and with the smaller end of its differential piston directed to receive the pressure of liquid displaced by its respective piston of the pump unit, said cam alternately projecting said pump pistons to alternately force relatively high pressure liquid into said branches up to the check valves therein, and a liquid discharge line extending from the high pressure side of each said branch and controlled by each respective differential piston valve, the pressure of fore pump liquid shifting the differential pistons in one direction to close said discharge lines until the higher pressure of the liquid displaced by the pump pistons shifts the differential pistons in the opposite direction to open said discharge lines.

2. Liquid pumping apparatus according to claim 1: a regulator connected in said conduit means to automatically bleed excess pressure therein to, thereby, maintain said pressure constant.

3. Liquid pumping apparatus according to claim 1: a regulator connected in said conduit means in advance of the check valves in the branches of said conduit means to automatically bleed excess pressure therein to, thereby, maintain said pressure constant, and a similar regulator connected in each branch beyond the check valves therein to bleed excess pressure of the high pressure liquid to maintain constant the pressure of the liquid flowing from the discharge lines.

4. Liquid pumping apparatus according to claim 1: a normally-open, pressure-operated switch mounted in the conduit means and set to close only upon a predetermined minimum pressure in said conduit means, and an electric circuit inter-connecting said switch and the drive of the constant-rise cam.

5. Liquid pumping apparatus according to claim 1: a normally-open, pressure-operated switch mounted in the conduit means and set to close only upon a predetermined minimum pressure in said conduit means, and an electric circuit inter-connecting said switch and the drive of the constant-rise cam; a normally-closed, pressure-operated switch electrically connected in series with the normally-open switch and said drive and set to open under pressure substantially in excess of the predetermined pressure in the high pressure portions of the conduit branches, and a pressure-conducting connection between each said branch portion and said normally-closed switch.

6. Liquid pumping apparatus according to claim 1: a normally-open, pressure-operated switch mounted in the conduit means and set to close only upon a predetermined minimum pressure in the conduit means, and an electric circuit inter-connecting said switch and the drive of the constant-rise cam; a normally-closed, pressure-operated switch connected to and responsive to the pressure in the branches beyond the check valves therein, said latter switch being electrically connected in series with the normally-open switch and set to open upon a substantial excess of pressure in said branches to stop said drive while the normally-open switch is closed; and an alarm, and an electric circuit to said alarm adapted to be closed by actuation of the normally-closed switch by said excess of pressure.

7. In pumping apparatus of the character described, a pump unit having opposed cylinders and pistons in said cylinders connected to move in unison and provided with a drive including a constant-rise cam to reciprocate the pistons at a constant speed, means to direct a continuous supply of liquid to said cylinders and against the opposite ends of the pistons thereof, alternately, under a predetermined and constant pressure less than the pressure of liquid discharged from the cylinders by said ends of the pistons alternately and during the retraction of the pistons and while said pistons are alternately discharging liquid, said pistons being so connected that one is retracting while the other is projecting, and means controlling each alternate discharge of higher pressure liquid and having control positions responsive to said predetermined and higher pressures, said predetermined and higher pressures alternately and simultaneously acting on the opposite ends of the opposed pistons to, thereby, lower the pressure forces on the cam to the difference of said pressures.

8. Pumping apparatus comprising two opposed and spaced cylinders, a piston in each cylinder, articulated means interconnecting the pistons, means to operate the articulated means to reciprocate said pistons in unison and at a constant speed, means to supply liquid under pressure to one cylinder during retraction of the piston thereof and while the piston of the other cylinder is projecting to discharge liquid from said other cylinder at a constant rate, and a differential valve means controlled by the differential of pressures of the supply and discharge liquids of each cylinder to alternate the supply and discharge of liquid to and from said cylinders.

References Cited in the file of this patent

UNITED STATES PATENTS

| | | |
|---|---|---|
| 1,891,618 | Campbell | Dec. 20, 1932 |
| 2,360,526 | Staples | Oct. 17, 1944 |
| 2,415,265 | Taylor | Feb. 4, 1947 |
| 2,423,701 | Hardy | July 8, 1947 |
| 2,561,786 | Davis | July 24, 1951 |